July 11, 1967 M. P. MARCUS 3,331,061

DRIVE-SENSE ARRANGEMENT FOR DATA STORAGE UNIT

Filed Nov. 27, 1963 2 Sheets-Sheet 1

INVENTOR

MITCHELL P. MARCUS

BY Henry E. Otto Jr.

ATTORNEY

DRIVE-SENSE ARRANGEMENT FOR DATA STORAGE UNIT

Filed Nov. 27, 1963 2 Sheets-Sheet 2

United States Patent Office 3,331,061
Patented July 11, 1967

3,331,061

DRIVE-SENSE ARRANGEMENT FOR DATA STORAGE UNIT

Mitchell P. Marcus, Binghamton, N.Y., assignor to International Business Machines Corporation, New York, N.Y., a corporation of New York Filed Nov. 27, 1963, Ser. No. 326,592
10 Claims. (Cl. 340—173)

This invention relates to data storage systems, and more particularly to an improved arrangement for driving and sensing information from data storage units.

In data processing systems, storage or memory units may be of the read-only type from which data in the form of a binary "1" or "0" may be read repeatedly without being destroyed during read out. These storage units may use storage elements of various types, such as magnetic cores, capacitors or resistors. One type of two-dimensional read-only storage unit heretofore proposed comprises a matrix of storage elements arranged in rows and columns. A separate driver is provided for driving all of the storage elements of the corresponding word consisting of a selected number of bits equal to the number of columns. A separate sense winding is threaded through or connected to all storage elements of each particular one of the columns. When a particular one of the drivers is energized, the corresponding multi-bit word will be selected, causing the associated sense windings to activate sense amplifier latches equal in number to the number of bit positions.

To reduce the number of drivers, it has been proposed to have each driver drive the storage elements of two words or addresses, then use a switching means to select a particular one of the two words. However, while the number of drivers would be halved, the number of sense amplifier latches would be doubled.

It would, of course be highly desirable to reduce the number of drivers in half without having to double the number of sense amplifier latches. It would also be desirable to be able to read out data from two groups of storage either selectively or successively during each drive pulse.

Accordingly, it is one object of this invention to provide a data storage system with a relatively inexpensive yet reliable driving and sensing arrangement wherein the number of drivers may be reduced substantially without having to increase the number of sense amplifiers.

Another object is to provide a data storage system having two groups of storage elements which are respectively rendered receptive only to the positive and negative excursions of a drive pulse that is concurrently supplied to selected storage elements from each such group, whereby data from one or the other is either selectively or successively gated out in the early or late portion of the drive pulse, responsively to an appropriate conditioning pulse.

Another object is to provide a drive-sense arrangement which is especially suitable for use with read-only storage units.

A further object is to provide a capacitor read-only storage unit with a simplified and relatively inexpensive driving and sensing arrangement.

According to the invention, a data storage system is provided wherein data storage elements (such as capacitors) are arranged in a matrix of columns and rows. In one embodiment illustrated, the elements in each row are divided into two groups. A separate drive line is connected to all elements of each row; and a separate sense line is connected to all elements of each column. Drive signals are capacitively coupled to selectable drive lines. Means, such as clamping diodes, are provided to limit the signals on all drive lines in one of the groups to prevent them from rising during positive excursions of the drive pulse;

and similar means are provided to limit the signals on all drive lines in the other group to prevent them from dropping during negative excursions of the drive pulse. Thus, the elements of said one group are receptive only to positive excursions of the drive pulses, and elements of said other group are receptive only to negative excursions of the drive pulses. One sense line in each group is connected to a corresponding sense amplifier. The sense amplifier will provide different outputs at different times corresponding first to the data stored in a particular bit position of said other group and then to the data stored in the corresponding bit position of said one group.

If one type of conditioning means is provided, data from selected elements of one group or the other group will be selectively gated out from the various sense amplifiers into corresponding sense amplifier latches. If a slightly different type of conditioning means is provided, data from selected elements of first the one group and then the other group will be successively gated out from the various sense amplifiers into corresponding latches.

The foregoing and other objects, features and advantages of the invention will be apparent from the following more particular description of preferred embodiments thereof, as illustrated in the accompanying drawings, wherein.

*Description*

Figure 1:
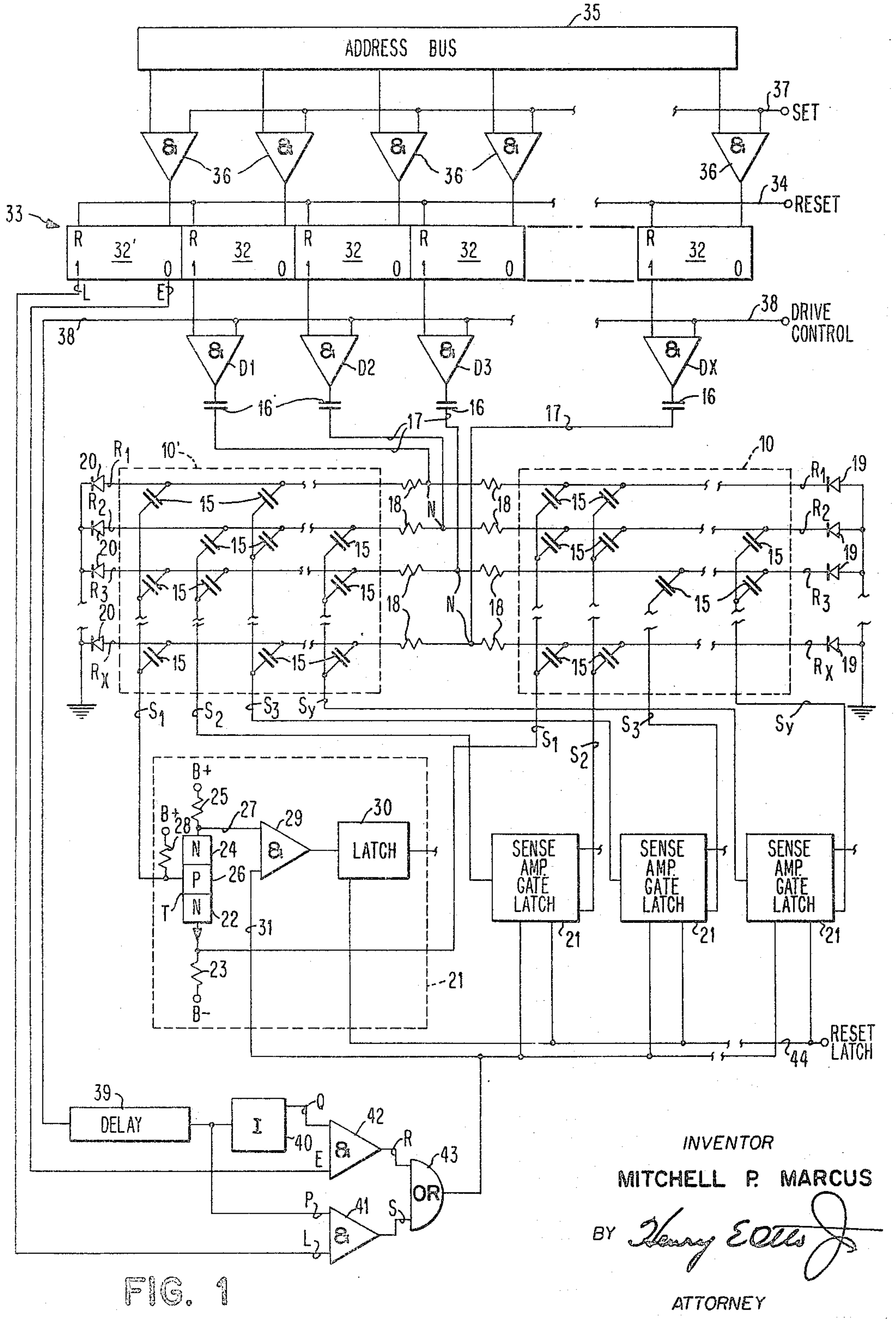
FIG. 1 is a schematic showing of a capacitor storage array and of the novel driving and sensing circuitry associated therewith.

The driving and sensing arrangement embodying the invention is shown applied to a capacitor-storage array. As illustrated in FIG. 1, this array comprises two two-dimensional capacitor read-only storage units 10, 10'. These units may be of the type shown and described on pages 462 and 463 of the IBM Journal dated October 1962, or in the co-pending application of Dodd et al., U.S. Ser. No. 302,508, filed Aug. 16, 1963, now U.S. Patent 3,187,309, issued June 1, 1965, assigned to the assignee of the present invention.

Figure 3:
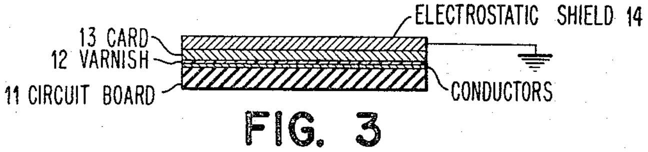
FIG. 3 is a sectional view of a card capacitor read-only storage unit.

Briefly, each such unit comprises (FIG. 3) a printed circuit board 11 with parallel conductors etched therein. The entire surface of the etched board is covered with a dielectric, such as a thin film 12 of silicone varnish. A paper card 13 printed with a conductive ink pattern serves as the information storage medium. This card is sandwiched between a grounded electrostatic shield 14 and the film 12. A capacitive coupling can be produced between conducting pads (not shown) on the card 13 and the circuit on the etched board 11, at those unique coordinate positions where a binary "1" is desired. Wherever a binary "0" is desired, a pad in the card is punched out to provide a hole that prevents any capacitive coupling between coincident columns and rows. Stray coupling at punched out locations is prevented by the grounded electrostatic shield 14.

As illustrated in FIG. 1, each unit 10, 10' comprises a plurality of rows of drive lines R1, R2, R3 . . . R$x$ and a plurality of columns of sense lines S1, S2, S3 . . . S$y$. A plurality of capacitors, like 15, are provided. Each capacitor has its respective plates connected to a predetermined drive line and sense line defining a unique coordinate address location at which a binary "1" is to be stored. At certain coordinate locations, no capacitors are shown. These schematically represent locations at which a binary "0" is stored, such as by the prepunching of holes in the card 13.

According to the invention, there are a plurality of current drivers D1, D2, D3 . . . D$x$ equal in number to the number of drive lines of one (but not both) of the identical units 10, 10'. Each driver is capacitively coupled through a respective capacitor 16 to a corresponding wire 17. A separate resistor 18 is interposed between each drive line of each unit and the corresponding single common wire 17. Thus, one driver, such as D1, concurrently drives the corresponding drive lines R1 of both units 10 and 10' through their respective resistors 18. All storage elements (capacitors 15) of unit 10 are considered as constituting one group; and each drive line R1 . . . R$x$ for the capacitors of this group is connected to ground through a respective diode 19. All storage elements 15 of unit 10' are considered as constituting another group; and each drive line R1 . . . R$x$ for the elements of this group is connected to ground through a respective diode 20.

It will be noted that diodes 19 and 20 are oppositely poled and serve as clamping diodes. The diodes 19 shunt or clamp all negative signal to ground. This renders all capacitors 15 of said one group (unit 10) receptive only to the positive excursions of a drive pulse. Conversely, diodes 20 shunt or clamp all positive signals to ground. Hence, all capacitors 15 of the other group (unit 10') are rendered receptive only to negative excursions of a drive pulse.

A plurality of sense amplifier-gate-latch combinations 21 are provided, which are equal in number to the number of sense lines S1 . . . S$y$ in a single unit 10 or 10'. Only one of these combinations 21 is shown in detail. Each oombination 21 comprises a sense amplifier in the form of a transistor T of the NPN type. This transistor has an emitter 22 connected via a resistor 23 to a source of negative potential B—. The transistor T has a collector 24 connected via a resistor 25 to a source of positive potential B+. The base 26 of each transistor T is connected to a predetermined different one of the sense lines of unit 10'. The corresponding sense line of unit 10 is connected between the resistor 23 and emitter 22 of the same transistor T. Thus, in the combination 21 illustrated, sense line S1 of unit 10' is connected to base 26, and the corresponding sense line S1 of unit 10 is connected to the emitter 22 of transistor T. A bias means is provided to normally bias transistor T ON and provide a negative output signal in transistor output line 27. As illustrated, this bias means comprises a resistor 28 connecting transistor base 26 with a source of positive potential B+. Output line 27 of transistor T leads to AND gate 29. This gate sets a latch 30 whenever signals are concurrently up in output 27 and in a line 31.

The time at which the up signal is provided in line 31 during a drive pulse determines whether the information gated out into the latch 30 will be that contained in unit 10 or that contained in unit 10'. A positive or up signal in line 31 is provided in the manner presently to be described.

The various triggers 32 of an address register 33 are reset by a signal supplied to a reset line 34. A particular address is gated out from an address bus 35 via respective AND gates 36 into corresponding triggers 32 by a signal applied to a set line 37. The triggers 32 are identical but one (for a particular digit position, such as the high order digit position of the address register) has been designated 32'. Trigger 32' provides a continuous output in either an early line E or a late line L. For example, if the high order bit of the selected address contains a "0," a positive signal will continuously be provided in early line E; but if the high order bit contains a "1," the trigger 32' will be switched when the signal is supplied to set line 37 and provide a continuous positive signal in late line L until trigger 32' is reset from line 34.

Whenever a drive control signal is supplied to a wire 38, data in the triggers 32 (but not 32') will be gated out through the corresponding drivers D1 . . . D$x$. Also, a signal will be supplied via a branch of wire 38 to a delay line 39. After a delay corresponding preferably to about one-half the total duration of the drive control signal, the output signal from the delay line is delivered in parallel to an inverter 40 and a late gate 41. The inverter supplies a positive signal to an early gate 42 during the first half of the drive control signal; whereas the delay line supplies a positive signal to late gate 41 during the second half of said drive signal.

*Summary of operation*

Figure 2:
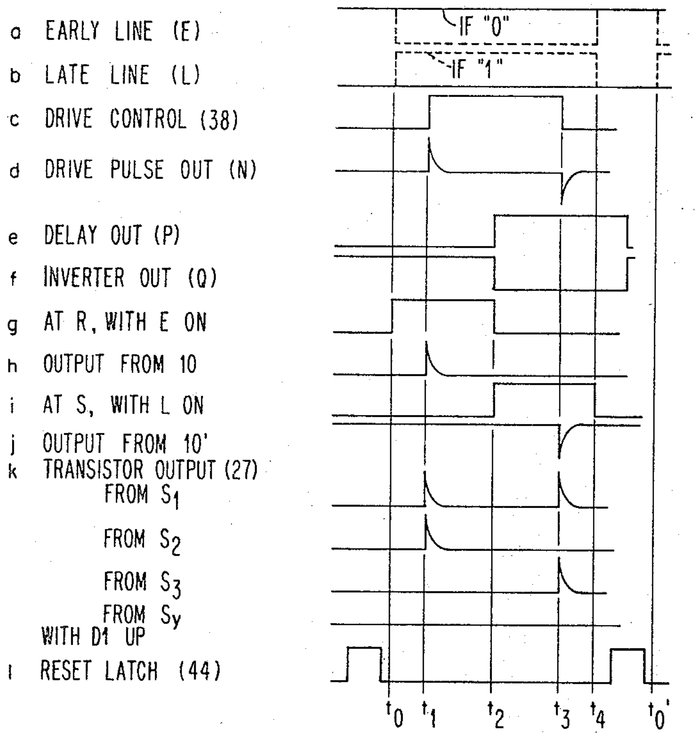
FIG. 2 is a timing diagram of the various waveforms to facilitate understanding of the drive-sense arrangement forming part of this invention.

If there is a "0" in the high order bit position of the address, the trigger 32' will not change state at set time $t0$ (see FIG. 2). Hence a positive signal will continuously be supplied to early line E (see FIG. 2$a$). Inverter 40 will provide a positive output signal at Q (see FIG. 2$f$) until this positive signal is inverted half-way through the drive control signal. Hence, with positive signals at both E and Q, an output signal will immediately be provided at R (see FIG. 2$g$) at $t0$ time by early AND gate 42. This positive signal will be transmitted from gate 42 via OR gate 43 to the line 31.

When a drive control signal is supplied to wire 38 at $t1$ time, the drivers D1 . . . D$x$ will gate out the data stored in the various address triggers 32. The output signal from each driver is capacitively coupled via the corresponding capacitor 16, thus producing a positive transient drive pulse (see FIG. 2$d$) at the various junctions N. The data in the various storage elements of said one group (i.e., of unit 10) will now be read out into the appropriate sense amplifiers of the various sense amplifier-gate-latch combinations 21. This is because the storage elements 15 of unit 10 are able to "see" and respond to the positive excursion of the drive pulse (whereas the elements 15 of unit 10' are prevented from doing so by the diodes 20).

Thus, assuming that the driver D1 is selected, the "1" stored at the location R1–S1 of unit 10 will produce a positive transient drive pulse at time $t1$ which will be supplied via sense line S1 to the emitter 22 of transistor T. The peak voltage of this signal thus supplied to emitter 22 must, of course, be at least as high as the bias voltage applied to the resistor 28 at base 26. Thus, the emitter-base junction of transistor T will be back biased temporarily, causing the transistor to turn OFF momentarily. This will produce a positive pulse in output line 27 (see FIG. 2$k$) substantially at $t1$ time. This pulse, when ANDed at 29 with the "early" signal already present in line 31, will provide an output from unit 10 (see FIG. 2$h$), and in this case set a "1" in latch 30.

It will be noted that branches of the selection or conditioning line 31 are connected to the other sense amplifier-gate-latch combinations 21 that are connected to the respective sense lines S2, S3 and S$y$ of both units 10, 10'. Hence, these other combinations 21 will also operate substantially at $t1$ time and in similar manner to store, in their respective latches 30, the information present at the locations R1–S2, R1–S3 and R1–S$y$ of unit 10.

On the other hand, now assume that the selected address has a "1" in the high order bit position, and that a positive signal is thus provided in the late line L at $t0$ time (see FIG. 2$b$). No signal can be transmitted via late AND gate 41 to line 31 until substantially $t2$ time which is approximately half-way through the drive pulse. At $t2$ time, the delay line 39 will deliver the delayed positive signal to P (see FIG. 2$e$) and hence via gate 41 to S (FIG. 2$i$) and thus line 31. However, no data can be gated through the various gates 29 into the corresponding latches 30 of any combination 21 until the negative excursion of the drive pulse occurs at $t3$ time (see FIG. 2$c$ and $d$). At $t3$ time, the storage elements 15 of the other group (i.e., unit 10') will "see" the negative excursion of the drive pulse. Thus, if driver D1 was selected, the "1" stored at location R1–S1 of unit 10' will produce a negative transient drive pulse at $t3$ time. This negative pulse will be supplied to the base 26 of transistor T. This will turn the transistor OFF and thus provide a momentary positive signal in output line 27.

Thus, at $t3$ time, with a positive signal already provided via late gate 41 in line 31, the momentary positive transient output pulse in transistor output line 27 (see FIG. 2*k*–S1) will activate gate 29 for storing a "1" in latch 30.

It will be understood that, at substantially $t3$ time, the other sense amplifier-gate-latch combinations 21 connected to the respective sense lines S2, S3 and S*y* of both units 10 and 10', will, in similar manner, store in their respective latches 30 the particular information at locations R1–S2, R1–S3 and R1–S*y*, respectively, of unit 10'.

Meanwhile, if there is no storage element at a particular bit location in unit 10, no positive signal will be provided to the emitter 22 of transistor T during the positive excursion of the drive pulse. Hence, the output signal in line 27 will remain negative. This will prevent the gate 29 from supplying a "set" or "1" signal to the corresponding latch 30 at $t1$ time. Similarly, if no storage element 15 is provided at a particular bit location in unit 10', no momentary negative signal will be delivered to the corresponding transistor T at $t3$ time. Since the transistor will thus not turn OFF, a negative signal will be maintained in output line 27 and prevent gate 29 for setting latch 30, even if a "late" signal should be provided in line 31.

At $t4$ time (after the drive control signal in line 38 has been removed), a reset signal is applied to line 34 to reset the triggers 32' and 32 of the address register 33. This will also reestablish a positive signal in early line E and a negative signal in late line L (see FIG. 2*a* and *b*). The latter will cause the signal level at S to fall (see FIG. 2*i*). At and after a subsequent set time $t0'$, the cycle will be repeated.

The sense amplifier latches 30 are reset in parallel by supplying a pulse to a reset line 44 at some time between $t4$ time and $t0'$ time.

It will now be apparent that the purpose of the capacitors 16 is to alter the drive control signal (FIG. 2*c*) to the waveform shown in FIG. 2*d*. These capacitors would be used irrespective of whether the memory is of the capacitor type illustrated or some other type.

Figure 4:
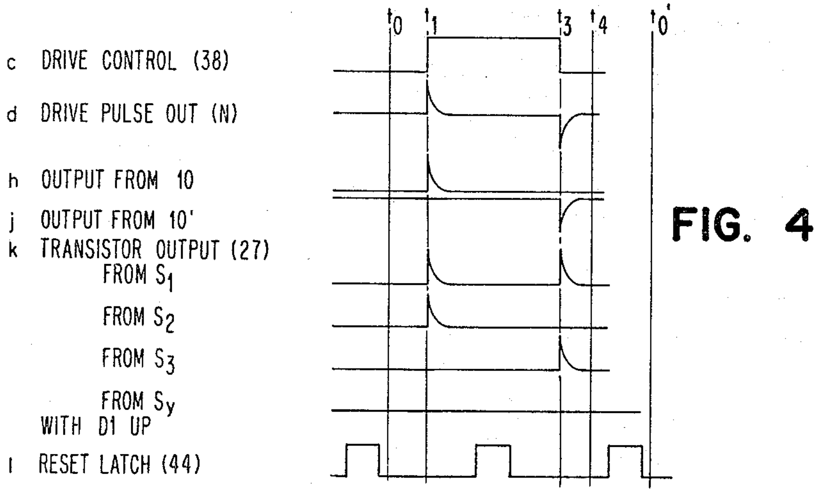
FIG. 4 is a timing diagram of waveforms illustrating a variation of the embodiment illustrated in FIGS. 1 to 3.

According to the variation of the invention denoted in FIG. 4, data is read out from two groups (10, 10') of storage elements successively (rather than selectively) during a single drive control pulse. This is readly accomplished by only slight changes in the structure actually shown in FIG. 1. First, the early and late lines E and L, delay line 39, inverter 40, AND gates 41, 42, OR gate 43, line 31 and AND gate 29 are eliminated. The output line 27 of each transistor T is connected directly to the corresponding latch 30. Also, the latch is reset twice (instead of only once) per drive control pulse. Otherwise, operation of this embodiment of the invention is the same as that described in connection with FIGS. 1 to 3. FIG. 4 shows typical waveforms for this successive read-out type of operation where two addresses are always read out successively for and during each drive control pulse.

It will be understood that, if either selective or successive read out, the storage elements 15 of unit 10 may be rendered receptive only to positive excursions of the drive pulses, and the elements of unit 10' rendered receptive only to negative excursions of the drive pulses, by means other than the clamping diodes 19 and 20, respectively. For example, if preferred, bias or filtering means may be substituted for the clamping means actually illustrated. Also, PNP transistors may be substituted for the NPN type sense amplifier transistors T illustrated, by making modifications obvious to those skilled in the art. Moreover, activation of the early and late gates 42 and 41 need not necessarily be controlled according to the information in a particular bit position of the address.

It will also be understood that while this invention is shown applied to a capacitor type data storage system, it may, if desired, be employed in storage systems with other types of storage elements.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data storage system wherein a plurality of storage elements are arranged in two groups, the combination of means for supplying drive pulses concurrently to selected elements in each group, means for rendering the elements of one of said groups receptive only to positive excursions of the drive pulses, means for rendering the elements of the other group receptive only to negative excursions of the drive pulses, sensing means for sensing data from said one group during said positive excursions and from the other group during said negative excursions, and means connected to the sensing means for transmitting data from said one group during the positive excursion of a drive pulse and transmitting data from said other group at a different time and during the negative excursion of the same drive pulse.

2. In a data storage system, the combination of a plurality of storage elements divided into two groups, a plurality of drive lines and sense lines positioned with respect to said elements so that each element is operationally connected to a unique pair of drive lines and sense lines, means providing transient drive pulses concurrently to selected ones of the drive lines in each group, means for rendering the elements of one of said groups receptive only to positive excursions of the drive pulses, means for rendering the elements of the other group receptive only to negative excursions of the drive pulses, and a plurality of sensing means each connected to one sense line in each group and responsive to the positive excursion of each drive pulse to provide at one time an output representing the data in a selected bit position in said one group and responsive to the negative excursion of the same pulse to provide at another time an output representing the data in a corresponding bit position in said other group.

3. In a data storage system wherin a plurality of storage elements are arranged in two groups, the combination of means for supplying drive pulses concurrently to selected elements in each group, means for rendering the elements of one of said groups receptive only to positive excursions of the drive pulses, means for rendering the elements of the other group receptive only to negative excursions of the drive pulses, and means including sensing means and conditioning means for gating out data at one time from the selected elements of said one group or at another time of said other group selectively.

4. In a data storage system wherein a plurality of storage elements are arranged in two groups, the combination of means for supplying drive pulses concurrently to selected elements in each group, means for rendering the elements of one of said groups receptive only to positive excursions of the drive pulses, means for rendering the elements of the other group receptive only to negative excursions of the drive pulses, sensing means for sensing data from said one group during said positive excursions and from the other group during said negative excursions of the same drive pulses, conditioning means having a plurality of conditions, and means connected to the sensing means and operative to gate out data from said one group or said other group according to the condition of said conditioning means.

5. The combination according to claim 4, wherein the conditioning means comprises an address register which supplies a signal of desired polarity to one or the other of two lines according to whether a particular bit position of the address does or does not contain a binary "1."

6. In a data storage system wherein a plurality of storage elements are arranged in two groups, the combination of means for supplying drive pulses concurrently to selected elements in each group, means for rendering the elements of one of said groups receptive only to positive excursions of the drive pulses, means for rendering the elements of the other group receptive only to negative excursions of the drive pulses, sensing means for sensing data from said one group during the positive excursion of any drive pulse and from the other group during the negative excursion of the same drive pulse, means for selectively providing a selection signal during the early or late portion of the drive pulse, and means connected to the sensing means for gating out data from said one group or said other group according to when a selection signal is provided.

7. In a data storage system, the combination of a plurality of storage elements divided into two groups, a plurality of drive lines and sense lines positioned with respect to said elements so that each element is operationally connected to a unique pair of drive lines and sense lines, means providing transient drive pulses concurrently to selected ones of the drive lines in each group, means for limiting the signals on all drive lines of one of said groups to prevent them from rising during the positive excursions of the drive pulses, means for limiting the signals on all drive lines of the other group to prevent them from dropping during the negative excursions of the drive pulses, a plurality of sensing means each connected to one sense line in each group to provide, at different times, outputs representing the unique data in a corresponding bit position of each group, and means including gating means variously conditioned during each drive pulse to select the particular group from which data is to be read out.

8. In a data storage system, the combination of a plurality of storage elements divided into two groups, a plurality of drive lines and sense lines positioned with respect to said elements so that each element is operationally connected to a unique pair of drive lines and sense lines, means providing drive pulses concurrently to selected ones of the drive lines in each group, means for limiting the signals on all drive lines of one of said groups to prevent them from rising during the positive excursions of the drive pulses, means for limiting the signals on all drive lines of the other group to prevent them from dropping during the negative excursions of the drive pulses, a plurality of sensing means each connected to one sense line in each group to provide, at different times, outputs representing the unique data in a corresponding bit position of each group, means providing a signal at one time or a different time during a drive pulse to select the particular group from which data is to be read out, and a separate gating means connected to the output of each sense line and to the last-introduced means for gating out data from said one group or other group according to when the selection signal is provided during the drive pulse.

9. In a data storage system having a plurality of storage elements arranged generally in columns and rows, with the elements in each row being divided into two groups, the combination of drive lines linking all elements of a particular row, sense lines linking all elements of a particular column, means supplying drive pulses to selectable drive lines, means for clamping all drive lines of one of said groups to a reference potential to shunt positive excursions of the drive pulses, and clamping all drive lines of the other group to such potential to shunt negative excursions of the drive pulses, a plurality of sensing means each connected to predetermined columns of storage elements in each group, means providing gate control pulses selectively during the positive or negative excursion of any drive pulse, and gating means connected to each sensing means for gating out bits of data from one group or the other group along the selected row according to which control pulse is provided during the drive pulse.

10. In a data storage system wherein a plurality of storage elements are arranged in two groups, the combination of means for supplying drive pulses concurrently to selected elements in each group, means for rendering the elements of one of said groups receptive only to positive excursion of the drive pulse, means for rendering the elements of the other group receptive only to negative excursions of the drive pulses, and sense amplifier means including a transistor biased to one condition and having its emitter connected to elements of said one group and its base connected to elements of said other group, such that following the positive excursion of each drive pulse the transistor will be operated to its other condition to provide a pulse of desired polarity at the collector, and following the negative excursion of each drive pulse the transistor will be operated to said other condition to provide a pulse of said desired polarity at the collector.

References Cited

UNITED STATES PATENTS

| | | | |
|---|---|---|---|
| 2,920,315 | 1/1960 | Markowitz et al. | 340—174 |
| 2,973,506 | 2/1961 | Newby | 340—347 |
| 3,040,303 | 6/1962 | James | 340—174 |

BERNARD KONICK, *Primary Examiner.*

H. D. VOLK, J. BREIMAYER, *Assistant Examiners.*